United States Patent [19]

Kurz et al.

[11] 4,029,864

[45] June 14, 1977

[54] CATALYST AND PROCESS FOR THE MANUFACTURE OF POLYETHYLENE

[75] Inventors: Dieter Kurz; Erich Männer, both of Burghausen, Germany

[73] Assignee: Wacker-Chemie GmbH, Munich, Germany

[22] Filed: May 5, 1976

[21] Appl. No.: 683,543

[30] Foreign Application Priority Data

May 12, 1975 Germany .......................... 2521075
Feb. 26, 1976 Germany .......................... 2607833
Feb. 26, 1976 Germany .......................... 2607832

[52] U.S. Cl. .......................... 526/125; 252/429 B; 252/429 C; 252/441; 526/140; 526/142; 526/352; 526/905
[51] Int. Cl.² .......................... C08F 4/66; C08F 10/02
[58] Field of Search .......... 252/429 B, 429 C, 441; 526/125, 140, 142, 144

[56] References Cited

UNITED STATES PATENTS

| | | | |
|---|---|---|---|
| 3,801,558 | 4/1974 | Fletcher et al. | 526/151 |
| 3,878,124 | 4/1975 | Durand et al. | 526/125 |

FOREIGN PATENTS OR APPLICATIONS 2,116,698  6/1972  France

*Primary Examiner* — Edward J. Smith
*Attorney, Agent, or Firm* — Hammond & Littell

[57] ABSTRACT

Improved catalyst and method for the manufacture of polyethylene comprising a catalyst based on a solid substance containing titanium, magnesium and chlorine activated by aluminum alkyls or reaction products of dialkyl aluminum hydrides with diolefins having from 4 to 20 carbon atoms, and its use in the manufacture of polyethylene where said solid substance is produced by (1) reacting metallic magnesium with at least 2 mols of allyl chloride and at least 1.75 mols of a di-lower alkyl ether, per gram-atom of magnesium at a temperature between about 30° C and about 100° C, (2) aging the solid reaction product for at least 10 hours at a temperature between about 30° C and about 140° C, (3) treating the solid reaction product either together, or subsequent to the aging step, with at least 0.2 mols of a di-lower alkyl sulfite, per gram-atom of magnesium, (4) reacting the aged and treated solid reaction product with at least 0.5 mols of

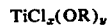
$TiCl_x(OR)_y$ wherein $x$ is a number from 2 to 4, $y$ is a number from 0 to 2, and the sum of $x + y$ is 4, per gram-atom of magnesium, for at least one hour at a temperature of from about $-20°$ C to $+140°$ C, and (5) separating said solid substance. With the use of the above catalyst, polyethylenes are obtained in good yields with a very good particle size distribution and substantially no dust-like components.

24 Claims, No Drawings

CATALYST AND PROCESS FOR THE MANUFACTURE OF POLYETHYLENE

THE RELATED ART

It has been known for a long time that catalysts consisting of a solid substance, containing titanium, magnesium and chlorine, which have been activated with aluminum alkyls, exhibit a very high activity when used for the polymerization of α-olefins, especially of ethylene, in hydrocarbons as the dispersion media. In recent years, a very large number of proposals for the manufacture of polyethylene have been disclosed, which particularly concern themselves with the method of manufacture of the solid catalyst substance used. A large proportion of these proposals is industrially unusable, if only because the particle properties of the polyethylene thereby obtained do not conform with the requirements necessary for polymerization, conveying and further processing of the material. Other proposals again are unusable because the physical properties of the moldings manufactured from the polyethylene are inadequate for many applications. It is unusually difficult optimally to satisfy the different requirements of easy processability, high rigidity, high impact strength and heat stability.

OBJECTS OF THE INVENTION

It is an object of the present invention to provide a process and catalyst for the manufacture of polyethylene by means of which it is possible substantially to fulfill the stated requirements.

Another object of the present invention is the development in the method for the production of polyethylene on a continuous or intermittent basis in either a single stage or multiple stages comprising reacting from 100 to 90 mol percent of ethylene and 0 to 10 mol percent of a 1,2-alkene having from 3 to 6 carbon atoms in a hydrocarbon dispersing media having a boiling point between 30° C and 160° C, at a pressure of from 4 to 40 atmospheres gauge and a temperature of from about 60° C to about 100° C, in the presence of a partial pressure of hydrogen of from 0 to 75% of the total pressure, in the presence of a catalytic amount of a solid catalyst substance containing titanium, magnesium and chlorine, and an activating amount of an aluminum activator selected from the group consisting of (a) aluminum alkyls of the formula

wherein R'' is alkyl having from 1 to 20 carbon atoms and R' is a member selected from the group consisting of hydrogen, R'' and chlorine, and (b) a reaction product of a dialkyl aluminum hydride having from 1 to 20 carbon atoms in each alkyl, with an alkadiene having from 4 to 20 carbon atoms, and recovering said polyethylene, the improvement consisting essentially of utilizing a solid catalyst substance containing titanium, magnesium and chlorine produced by the steps consisting essentially of (1) reacting metallic magnesium having a large surface area per volume with from 2 to 10 mols of allyl chloride and from 1.75 to 3 mols of a di-lower alkyl ether, per gram-atom of magnesium at a temperature of from about 30° C to about 100° C, (2) maintaining the solid reaction product formed for at least 10 hours at a temperature of between about 30° C to about 140° C in order to age the same, (3) treating said solid reation product formed, either together with or subsequent to said aging step (2), with from 0.2 to 4 mols of a di-lower alkyl sulfite, per gram-atom of magnesium, (4) reacting the aged and treated solid reaction product with from 0.5 to 10 mols of a titanium compound of the formula

wherein $x$ is a number from 2 to 4, $y$ is a number from 0 to 2 and the sum of $x + y$ is 4, and R is a member selected from the group consisting of alkyl having 1 to 8 carbon atoms, cycloalkyl having 5 to 8 carbon atoms, chloralkyl having 2 to 8 carbon atoms, chlorocycloalkyl having 5 to 8 carbon atoms and dichloroalkyl having 3 to 8 carbon atoms, per gram-atom of magnesium, for at least one hour at a temperature between about −20° C and about +140° C, and (5) separating said solid catalyst substance containing titanium, magnesium and chlorine.

A further object of the present invention is the development of a solid catalyst substance containing titanium, magnesium and chlorine for the polymerization of ethylene after activation with an organo-aluminum compound produced by the steps consisting essentially of (1) reacting metallic magnesium having a large surface area per volume with from 2 to 10 mols of allyl chloride and from 1.75 to 3 mols of a di-lower alkyl ether, per gram-atom of magnesium at a temperature of from about 30° C to about 100° C, (2) maintaining the solid reaction product formed for at least 10 hours at a temperature of between about 30° to about 140° C in order to age the same, (3) treating said solid reaction product formed, either together with or subsequent to said aging step (2), with from 0.2 to 4 mols of a di-lower alkyl sulfite, per gram-atom of magnesium, (4) reacting the aged and treated solid reaction product with from 0.5 to 10 mols of a titanium compound of the formula

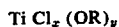

wherein $x$ is a number from 2 to 4, $y$ is a number from 0 to 2 and the sum of $x + y$ is 4, and R is a member selected from the group consisting of alkyl having 1 to 8 carbon atoms, cycloalkyl having 5 to 8 carbon atoms, chloroalkyl having 2 to 8 carbon atoms, chlorocycloalkyl having 5 to 8 carbon atoms and dichloroalkyl having 3 to 8 carbon atoms, per gram-atom of magnesium, for at least one hour at a temperature between about −20° C and about +140° C, and (5) separating said solid catalyst substance containing titanium, magnesium and chlorine.

These and other objects of the invention will become more apparent as the description of the invention proceeds.

DESCRIPTION OF THE INVENTION

The invention relates to a process for the manufacture of polyethylene by continuous or discontinuous single-stage or multi-stage polymerization of ethylene, optionally together with up to 10 mol percent of α-olefins of 3 to 6 carbon atoms, in hydrocarbons as the dispersing media, at pressures of 4 to 40 atomspheres gauge and temperatures of 60° C to 100° C, optionally in the presence of hydrogen, using a catalyst which consists of a solid catalyst substance, containing titanium, magnesium and chlorine, which has been activated with aluminum alkyls or reaction products of dialkyl-aluminum hydrides with diolefins of 4 to 20 carbon atoms, characterized in that the solid catalyst substance is manufactured by reacting metallic magnesium with at least 2, preferably 2.2 to 10, mols of allyl chloride and 1.75 to 3 mols of dialkyl ether per gram-atom of magnesium at 30° C to 100° C, aging the solid formed for at least 10, preferably 24 to 150, hours, at 30° C to 140° C, preferably 50° C to 80° C, and after treatment with at least 0.2, and preferably 0.7 to 4, mols of dialkyl sulfite per gram-atom of magnesium, reacting the product with 0.5 to 10, preferably 1 to 5, mols of $TiCl_x(OR)_y$, wherein $x$ can assume a value from 2 to 4, $y$ can assume a value from 0 to 2, and $x + y = 4$, per gram-atom of magnesium for 1 to 25 hours at $-20°$ C to 140° C, and isolating the product from the reaction mixture.

More particularly, the present invention relates to the improvement in the method for the production of polyethylene on a continuous or intermittent basis in either a single stage or multiple stages comprising reacting from 100 to 90 mol percent of ethylene and 0 to 10 mol percent of a 1,2-alkene having from 3 to 6 carbon atoms in a hydrocarbon dispersing media having a boiling point between 30° C and 160° C, at a pressure of from 4 to 40 atmospheres gauge and a temperature of from about 60° C to about 100° C, in the presence of a partial pressure of hydrogen of from 0 to 75% of the total pressure, in the presence of a catalytic amount of a solid catalyst substance containing titanium, magnesium and chlorine, and an activating amount of an aluminum activator selected from the group consisting of (a) aluminum alkyls of the formula $$Al\ R''_2R'$$

wherein $R''$ is alkyl having from 1 to 20 carbon atoms and $R'$ is a member selected from the group consisting of hydrogen, $R''$ and chlorine, and (b) a reaction product of a dialkyl aluminum hydride having from 1 to 20 carbon atoms in each alkyl, with an alkadiene having from 4 to 20 carbon atoms, and recovering said polyethylene, the improvement consisting essentially of utilizing a solid catalyst substance containing titanium, magnesium and chlorine produced by the steps consisting essentially of (1) reacting metallic magnesium having a large surface area per volume with from 2 to 10 mols of allyl chloride and from 1.75 to 3 mols of a di-lower alkyl ether, per gram-atom of magnesium at a temperature of from about 30° C to about 100° C, (2) maintaining the solid reaction product formed for at least 10 hours at a temperature of between about 30° C to about 140° C in order to age the same, (3) treating said solid reaction product formed, either together with or subsequent to said aging step (2), with from 0.2 to 4 mols of a di-lower alkyl sulfite, per gram-atom of magnesium, (4) reacting the aged and treated solid reaction product with from 0.5 to 10 mols of a titanium compound of the formula $$Ti\ Cl_x\ (OR)_y$$

wherein $x$ is a number from 2 to 4, $y$ is a number from 0 to 2 and the sum of $x + y$ is 4, and R is a member selected from the group consisting of hydrocarbon groups, such as alkyl having 1 to 8 carbon atoms and cycloalkyl having 5 to 8 carbon atoms, and chlorinated hydrocarbon groups, such as chloroalkyl having 2 to 8 carbon atoms, chlorocycloalkyl having 5 to 8 carbon atoms and dichloroalkyl having 3 to 8 carbon atoms, per gram atom of magnesium, for at least one hour at a temperature between about $-20°$ C and about $+140°$ C, and (5) separating said solid catalyst substance containing titanium, magnesium and chlorine.

In addition, the invention relates to the solid catalyst substance containing titanium, magnesium and chlorine of the invention and the method of producing the same.

The metallic magnesium which is used for the production of the solid catalyst substance should have a large surface area per volume and is preferably in particulate form. This can be, for example, magnesium filings, magnesium grit or magnesium powder. As in the manufacture of Grignard compounds, the magnesium is preferably activated with small amounts of iodine. The presence of ether is absolutely essentially, for the reaction. Di-lower alkyl ethers with identical or different alkyl groups may be used. Preferably, the alkyl groups have 2 to 4 carbon atoms, diethyl, ether being particularly suitable. Further solvents, such as, for example, benzine or benzene, may also be added.

For the reaction of magnesium with allyl chloride and di-lower alkyl ether, it is preferred first to take the magnesium and allyl chloride and slowly to add the ether dropwise, or first to take the magnesium and add the allyl chloride and ether dropwise. It is also possible to introduce magnesium slowly into an allyl chloride/ether mixture. In contrast to the preparation of Grignard compounds, it is less advantagous, from the point of view of the solid properties of the magnesium chloride, to take magnesium and ether initially and slowly add the allyl chloride. In order to achieve good properties of the solid, the molar ratios of the reactants, indicated above should be observed.

The reaction temperature is preferably from about 30° C to about 100° C. The reaction is frequently carried out by refluxing at ambient pressure. After bringing the components together, the reaction mixture is kept at the reaction temperature for some hours longer, to complete the reaction.

The solid reaction product produced, which is substantially but not exactly magnesium chloride as to composition, must be subjected to thermal aging. Without thermal aging, on polymerization a very dust-producing polyethylene is obtained. The aging is carried out advantageously in the presence of hydrocarbons or also chlorinated hydrocarbons. Suitable hydrocarbons are, here as in the following, those which are known as dispersing media for the polymerization of ethylene. These are mainly aliphatics, cycloaliphatics and aromatics with boiling points between 30° C and 160° C. There may be used, for example, hexane, heptane, isooctane, cyclohexane, benzene, toluene, or benzine fractions in the stated boiling range. The chlorinated hydrocarbons employed are those within the same boiling range, for example, methylene chloride, chloroform, carbon tetrachloride, 1,2-dichloroethane, 1,1,2-trichloroethylene, tetrachloroethane or chlorobenzene. One can simply dilute the reaction mixture with the hydrocarbon or chlorinated hydrocarbon prior to the thermal aging, in which case the degree of dilution is not critical. Generally, the dilution ratio of reaction product to hydrocarbon or chlorinated hydrocaron is from 1:0.5 to 1:5. Simultaneously with the dilution, with an adequate boiling point difference, the other components of the reaction mixture can be separated by distillation, obtaining ether, excess allyl chloride, and the formed diallyl. Another possibility is first to separate the solid from the reaction mixture mechanically or by distillation and to suspend it in the hydrocarbon or chlorinated hydrocarbon. The aging may also be carried out in the reaction mixture from the first step itself or in the dry state. These methods, however, are of minor importance. The aging takes place for at least 10, preferably 24 to 150 hours, at from about 30° C to about 140° C, preferably about 50° C to about 80° C.

Following the aging, the treatment with di-lower alkyl sulfite may occur, which is essential for high yields of polyethylene, based on magnesium charged. The reasons for this are unknown. Alternatively the aging and di-lower alkyl sulfite treatment may be conducted simultaneously employing the conditions of temperature, time and dilution described for the aging. The amounts of di-lower alkyl sulfite employed are usually at least 0.2, preferably 0.7 to 4, mols of di-lower alkyl sulfite per gram-atom of magnesium. Generally, more di-lower alkyl sulfite brings no advantages. If the treatment is carried out after the aging steps, the treatment time is normally one-half hour to five hours at temperatures between −50° C and +120° C. Preferably the treatment step is conducted in suspensions where one liter contains a quantity of solid reaction product corresponding to 0.2 to 2 gram-atom of magnesium. The alkyl groups in the di-lower alkyl sulfite my be different, but preferably they are the same. The alkyl groups can contain 1 to 6, preferably 2 to 4, carbon atoms. If the liquid reaction products originating from the allyl chloride reaction (ether, allyl, chloride, diallyl, and possibly hydrocarbon or chlorinated hydrocarbon) had not yet been removed, this must be done before the further reaction with the titanium component. This can be accomplished by decanting, centrifuging, or filtering. However, the separation is best done by distillation.

The titanium-containing solid component of the catalyst is obtained by reacting the solid reaction product (essentially magnesium chloride), which has been aged and treated with di-lower alkyl sulfite, with $TiCl_x(OR)_y$, wherein $x$ assumes a value of 2 to 4 and $y$ a value of 0 to 2 and $x + y = 4$. R is a member selected from the group consisting of hydrocarbon groups, such as alkyl having 1 to 8 carbon atoms and cycloalkyl having 5 to 8 carbon atoms, and chlorinated hydrocarbon groups, such as chloroalkyl having 2 to 8 carbon atoms, chlorocycloalkyl having 5 to 8 carbon atoms and dichloroalkyl having 3 to 8 carbon atoms.

The reaction can be carried out without the removal of the excess di-lower alkyl sulfite, but in general, particularly if more than 1 mol of di-lower alkyl sulfite is used per gram-atom of magnesium, it is better first to separate off the solid and to elute it, for example, with hydrocarbons. The reaction can be carried out without diluents but is preferably carried out in a hydrocarbon suspension. Per gram-atom of magnesium, 0.5 to 10, preferably 1 to 5, mols of $TiCl_x(OR)_y$ are employed. The value of $x$ is preferably 3 to 4 and the value of $y$ is 0 to 1. The reaction is carried out for 1 to 25 hours at temperatures of between about −20° C and about 140° C. Thereafter the finished solid component is isolated by decanting, centrifuging or filtering and is washed, for example, with hydrocarbons.

The alkoxide groups of the titanium compounds frequently contain 1 to 8, preferably 2 to 4, carbon atoms. These compounds are generally prepared by reactions of $TiCl_4$ with $TiOR_4$ in appropriate molar ratios. In this way, any value of $x$ and/or $y$ can be achieved. The values $x$ and $y$ are to be regarded as average values of the total titanium component, so that they also include fractions, that is to say, not only $TiCl_4$, $TiCl_3OR$ or $TiCl_2(OR)_2$, but also for example, $TiCl_{3.5}(OR)_{0.5}$, $TiCl_{2.9}(OR)_{1.1}$ and the like.

A preferred form of realization of the invention consists in using as titanium component 0.5 to 10, preferably 1 to 5, mols of a reaction product between $TiCl_4$ and an alkylene oxide or chloroalkylene oxide in the molar ratio $TiCl_4$ : alkylene oxide = 1:0.5 to 2, more particularly 1:1, at temperatures between about 20° C and about 90° C and for 1 to 25 hours.

The alkylene oxides employed contain 2 to 8 carbon atoms, such as ethylene oxide, propylene oxide, 1,2-epoxy butane, cyclohexene oxide, Preferably, however, a chloroalkylene oxide having from 3 to 8 carbon atoms is employed, such as epichlorohydrin.

The reaction of the alkylene oxide or chloroalkylene oxide with $TiCl_4$ can be carried out in a special preparing vessel as well as in situ in the presence of the solid.

The titanium compound reacted with the solid aged and treated magnesium compound can thus be either a titanium compound of the formula $$TiCl_x(OR''')_y$$

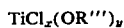

wherein $x$ and $y$ have the above-assigned values and $R'''$ is alkyl having from 1 to 8 carbon atoms, or the reaction product of 1 mol of $TiCl_4$ with 0.5 to 2 mols of an oxide selected from the group consisting of vicinal alkylene oxide having 2 to 8 carbon atoms, cycloalkene oxide having 5 to 8 carbon atoms, and monochlorinated vicinal alkylene oxide having 3 to 8 carbon atoms, where the reaction is conducted at a temperature between about 20° C and about 90° C for from 1 to 25 hours.

The reaction product is probably a mixed titanium chloride alkoxide of the formula $$TiCl_x(OR^{iv})_y$$

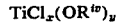

where $x$ and $y$ have the above values and $R^{iv}$ is chloroalkyl having 2 to 8 carbon atoms, chlorocycloalkyl having 5 to 8 carbon atoms or dichloroalkyl having from 3 to 8 carbon atoms.

In order to activate the solid catalyst substance containing titanium magnesium and chlorine of the invention, aluminum alkyls of the formula $$Al\ R''_2 R'$$

wherein $R''$ is alkyl having from 1 to 20 carbon atoms and $R'$ is a member selected from the group consisting of hydrogen, $R''$ and chlorine, or reaction products of dialkyl aluminum hydrides with diolefins with 4 to 20 carbon atoms (alkadienes) are employed. The aluminum alkyls can each contain one hydrogen atom or one chlorine atom but aluminum trialkyls are preferred. In general, the alkyl radicals have a chain length of 1 to 20, especially 1 to 10 and preferably 2 to 4, carbon atoms. Examples of alkyl groups are ethyl, propyl, isopropyl, butyl, isobutyl, octyl and dodecyl. Isoprene is preferentially employed for the preparation of the reaction products of dialkyl aluminum hydrides and diolefins. The use of aluminum triethyl or aluminum triisobutyl is particularly advantageous.

The aluminum component is in most cases employed in a large excess, relative to the titanium in the solid, for example, in molar ratios of titanium to aluminum component of 1:10 to 1:1,000, preferably 1:20 to 1:500. The aluminum alkyl can be reacted, entirely or partially, with the solid catalyst substance in a hydrocarbon suspension at temperatures of about 0° to about 100° C, prior to the polymerization, or alternatively, both components can be metered separately into the polymerization reactor.

The polymerization itself can be carried out in a known manner, continuously or discontinuously, in one stage or several stages. It is carried out at temperatures of about 60° C to about 100° C and pressures of 4 to 40 atmospheres. In general, the molecular weight of the polymerizate is regulated by adding hydrogen. When using the catalyst system according to the invention, this regulating by means of hydrogen is particularly easy to carry out. The polymerization pressures indicated above are to be understood as the total pressure, made up of the partial pressures of ethylene and hydrogen. The partial pressure of hydrogen can account for up to 75% of the total pressure but can also be zero, and correspondingly the ethylene partial pressure is at least 25% and up to 100%. In order to influence the physical properties of the polyethylene, especially to increase its resistance to stress cracking, other $\alpha$-olefins with 3 to 6 carbon atoms (1,2-alkenes with 3 to 6 carbon atoms) may be added in amounts of up to 10 mol percent, relative to ethylene.

In the discontinuous process, the polymerization in several stages is carried out by altering the reaction conditions, especially the composition of the gas phase, in stages during the polymerization.

In the continuous polymerization, it is possible, for example, periodically to alter the hydrogen partial pressure in a polymerization reactor, say in the pattern of a square-wave or saw-tooth curve with a frequency of the order of magnitude of the average residence time. Alternatively, the polymerization suspension can be allowed to pass successively through two or more reactors set to apply different reaction conditions. Preferably, two reactors with different hydrogen partial pressure are employed. In this event, it is advantageous to employ, as the catalyst, a solid which has been produced using $TiCl_4$. Particularly good results are achieved if the hydrogen partial pressure in the first reactor is at least five times as great as in the second. In this way it is possible to manufacture polyethylenes of medium and high molecular weight which have very good processing properties.

In the case of copolymerization with other $\alpha$-olefins, it is advantageous to add these only in the second stage or in the second reactor.

The process according to the invention gives polyethylenes in high yields, relative to the amount of magnesium employed, and with very good particle size distributions (substantially no dust-like component). The polyethylene is of high density, exhibits good processing properties, has low ash contents and gives very rigid products of high impact strength and good heat stability.

The following examples are illustrative of the practice of the invention without being limitative.

EXAMPLES

The melt index mentioned in the examples was determined according to DIN 53,735 at 190° C and 5 kp load. The flow ratio is the quotient of the melt indices under 21.6 and 5 kp load.

EXAMPLE 1A (Catalyst Production)

A one-liter, three-necked flask equipped with a stirrer, dropping funnel and reflux condenser was charged with 12.2 gm of magnesium, 90 ml of allyl chloride and 0.1 gm of iodine. 150 ml of diethyl ether were introduced dropwise during the course of 40 minutes into the vessel, which had first been flushed with very pure nitrogen, while stirring (200 rpm) and warming slightly. After 10 to 15 minutes, the reaction started and the reaction mixture began to boil. After the dropwise addition was completed, the stirring was continued for four hours at the reflux temperature. The mixture was then made up to 500 ml with benzene and stirred for a further 70 hours under reflux (aging). The solid from 50 ml of the suspension obtained was eluted by repeated decanting and suspending in isooctane at 70° C. Finally, the suspension was again brought to 50 ml with isooctane and treated with 2.5 ml of diethyl sulfite for one hour at 70° C. 27.5 ml of titanium tetrachloride were then added dropwise and the mixture was stirred for two hours at 95° C. The solid was again eluted by decanting and suspending at 95° C and was then suspended in 150 ml of isooctane.

EXAMPLE 1B (Polymerization)

The polymerization was carried out in a one-liter glass autoclave employing 0.5 ml of the suspension of the solid obtained above and 1 ml of aluminum triethyl in 700 ml of isooctane at 85° C. Six atmospheres (gauge) of $H_2$ and four atmospheres (gauge) of $C_2H_4$ were charged and maintained. After one and a half hours, 134 gm of polyethylene of uniform particle size were obtained. The yield corresponds to 208 gm per mg of titanium employed. The polyethylene has a melt index of 26 and the proportion of particles under 100 $\mu$ is 0.2%.

EXAMPLE 2A (Catalyst Production)

50 ml of the solid suspension which has been prepared and aged as in Example 1A were treated, in the manner described there, first at 20° C and then at 95° C with isooctane to remove ether, allyl chloride, diallyl and benzene, until at most only 0.1% of the original liquid phase remained. 10 ml of diethyl sulfite were then added to the 50 ml of suspension. The mixture was stirred for one hour at 95° C and the excess diethyl sulfite was removed at the same temperature by repeated decanting and suspension in isooctane. The suspension, brought to 50 ml, was then treated with titanium tetrachloride as in Example 1A, but with stirring for five hours at 95° C. Finally, the product was eluted and made up to 150 ml, as described.

EXAMPLE 2B (Polymerization)

The polymerization is carried out in a five-liter autoclave employing 1 ml of the suspension of the solid obtained above and 5 ml of aluminum triethyl in 3.5 liters of isooctane. Polymerization was first carried out for 50 minutes at 7 atmospheres (gauge) of $H_2$ and 3 atmospheres (gauge) of $C_2H_4$, and then for ten minutes at 0.05 atmospheres (gauge) of $H_2$ and 9.95 atmospheres (gauge) of $C_2H_4$. 720 gm of a coarsely granular polyethylene were obtained. The yield corresponds to 206 gm per mg of titanium employed. 95% of the polyethylene has a particle size of between 0.5 and 0.6 mm, the melt index is 0.3 and the flow ratio is 22.

EXAMPLE 3A (Catalyst Production)

The preparation of the solid catalyst substance, including the treatment with diethyl sulfite, was carried out as described in Example 1A, except that in place of 2.5 ml, 5 ml of diethyl sulfite were now employed, and the excess of diethyl sulfite was removed as described in Example 2A. 14 ml of titanium tetra-n-propylate were added to the suspension, which had been brought to 50 ml. After stirring for one hour at 70° C, 16.5 ml of titanium tetrachloride were added dropwise and stirring was continued for one hour at 70° C. The product was then eluted as in Example 1A and the volume of the suspension was brought to 150 ml.

EXAMPLE 3B (Polymerization)

The polymerization was carried out as in Example 1A, but at 7 atmospheres (gauge) of $H_2$ and 3 atmospheres (gauge) of $C_2H_4$. 221 gm of uniformly finely granular polyethylene were obtained, corresponding to a yield of 192 gm per mg of titanium employed. The melt index is 19.

If the catalyst production was carried out under otherwise identical conditions, but with titanium tetraisopropylate, 181 gm of uniformly coarsely granular polyethylene of melt index 17 were obtained on polymerization under the same conditions.

EXAMPLE 4

The solid catalyst substance was prepared as in Example 2A, except that the treatment with diethyl sulfite was carried out for one hour at 70° C and the reaction with titanium tetrachloride was carried out for three hours at 70° C.

The polymerization was carried out in two stages in a five-liter autoclave employing 1 ml of suspension of the solid and 5 ml of aluminum triethyl in 3.5 liters of isooctane, with the addition of 13 gm of 1-butene.

First stage: 50 minutes at 6.5 atmospheres (gauge) of $H_2$ and 3.5 atmospheres (gauge) of $C_2H_4$.

Second stage: 15 minutes at 0.05 atmosphere (gauge) of $H_2$ and 9.95 atmospheres (gauge) of $C_2H_4$.

1.116 gm of polyethylene, corresponding to 320 gm per mg of titanium were obtained. The melt index is 0.43 and the flow ratio is 23.

EXAMPLE 5A (Catalyst Production)

A one-liter, three-necked flask equipped with agitator, dropping funnel and reflux condenser was charged with 12.2 gm of magnesium. After purging with pure nitrogen, a mixture of 150 ml of diethyl ether and 90 ml of allyl chloride was dropped into the flask over a period of 40 minutes with agitation (200 rpm) and gentle heating. The reaction started after one to two minutes and the reaction mixture began to boil. After completion of the dropwise addition, the mixture was stirred for three hours at reflux temperature. Then, 40 ml of diethyl sulfite were added and the mixture was agitated for one hour at 50° C external temperature. The suspension was then diluted with isooctane to 500 ml and the heating bath temperature was increased to 75° to 80° C (with reflux). At this temperature, the aging took place for 65 hours with agitation. Then the ether, allyl chloride, and diallyl were distilled off, preferably while increasing the external temperature to 95° C. The distillate was continuously replaced by isooctane. After the distilling and cooling, the suspension was brought to 500 ml.

50 ml of this suspension were admixed with 27.5 ml of $TiCl_4$ and stirred for two hours at 95° C. Then the precipitate was washed with isooctane at 95° C until no further titanium is detectable in the isooctane, and the solid catalyst substance was suspended in 150 ml of isooctane.

EXAMPLE 5B (Polymerization)

The polymerization was conducted in a one-liter glass autoclave employing 0.5 ml of solid suspension and 0.5 ml of aluminum triethyl in 700 ml of isooctane at 85° C, 6 atmospheres (gauge) partial pressure of $H_2$ and 4 atmospheres (gauge) partial pressure of ethylene were maintained in the autoclave. After one and a half hours, 220 gm of uniformly granular polyethylene were obtained. The yield corresponds to 220 gm per mg of titanium charge. The polyethylene has a melt index of 46 and a bulk density of 340 gm/liter. The amount of particles under 100 $\mu$ is 0.4%.

EXAMPLE 6A.

(Catalyst Production)

The preparation of the solid catalyst substance was conducted as in Example 5A, except that the suspension, after the diethyl sulfite treatment, was diluted with methylene chloride to 500 ml and aged for 60 hours at a bath temperature of 65° C (with reflux) with agitation.

Then the liquid reaction products were distilled off together with the methylene chloride and replaced by isooctane, with the external temperature rising to 100° to 105° C. After cooling, the suspension is filled up to 500 ml with isooctane. 50 ml of this suspension were further treated as in Example 5A.

EXAMPLE 6B (Polymerization)

0.5 of the finished catalyst suspension and 0.5 ml of $AlEt_3$ yielded after one and a half hours under partial pressure of 6 atmospheres (gauge) of $H_2$ and 4 atmospheres (gauge) of ethylene at a temperature of 85° C, 290 gm of polyethylene. The yield corresponds to 194 gm per mg of titanium charged. The polyethylene has a melt index of 50 and a bulk density of 330 gm/liter. The amount of particles under 100 $\mu$ is 0.5%.

EXAMPLE 7

50 ml of the solid suspension prepared and aged according to Example 1A and treated with diethyl sulfite according to Example 2A were cooled to room temperature and admixed with 16.5 ml of $TiCl_4$. Then 11.6 ml of epichlorohydrin in 70 ml of isooctane were added in drops within one hour with agitation.

Then the temperature was brought to 95° C and the reaction product was stirred for two hours at this temperature. Finally rinsing was done as described and the suspension was brought to 150 ml.

0.5 ml of the catalyst suspension and 0.5 ml of AlEt$_3$ yielded after one and a half hours at partial pressures of 6 atmospheres (gauge) and H$_2$ and 4 atmospheres (gauge) of ethylene, at 85° C, 270 gm of a uniformly granular polyethylene.

The yield corresponds to 193 gm per mg of titanium charged. The polyethylene has a melting index of 133 and a bulk density of 395 gm/liter. The amount of particles under 100 μ is 1%.

EXAMPLE 8

50 ml of the solid suspension prepared according to Example 7 were washed twice with 75 ml of isooctane each time, cooled to room temperature, and admixed with 16.5 ml of TiCl$_4$. Subsequently 11.6 ml of epichlorohydrin in 70 ml of isooctane were added dropwise within one hour with agitation. After ten hours of stirring at room temperature, the mixture was heated to 95° C and the stirring was continued for another two hours. Finally rinsing was done as described and the suspension was brought to 150 ml.

0.5 ml of catalyst suspension and 0.5 ml of AlEt$_3$ yielded after one and a half hours at partial pressures of 6 atmospheres (gauge) of H$_2$ and 4 atmospheres (gauge) of ethylene at 85° C, 210 gm of a uniformly granular polyethylene. The yield corresponds to 191 gm per mg of titanium charged. The polyethylene has a melting index of 119 and a bulk density of 381 gm/liter. The amount of particles under 100 μ is 0.7%.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the method for the production of an ethylene polymer on a continuous or intermittent basis in either a single stage or multiple stages comprising reacting from 100 to 90 mol percent of ethylene and 0 to 10 mol percent of a alpha-olefin having from 3 to 6 carbon atoms in a hydrocarbon dispersing media having a boiling point between 30° C and 160° C, at a pressure of from 4 to 40 atmospheres gauge and a temperature of from about 60° C to about 100° C, in the presence of a partial pressure of hydrogen of from 0 to 75% of the total pressure, in the presence of a catalytic amount of a solid catalyst substance containing titanium, magnesium and chlorine, and an activating amount of an aluminum activator selected from the group consisting of (a) aluminum alkyls of the formula AlR''$_2$R' wherein R'' is alkyl having from 1 to 20 carbon atoms and R' is a member selected from the group consisting of hydrogen, R'' and chlorine, and (b) a reaction product of a dialkyl aluminum hydride having from 1 to 20 carbon atoms in each alkyl, with an alkadiene having from 4 to 20 carbon atoms, and recovering said polyethylene, the improvement consisting essentially of utilizing a solid catalyst substance containing titanium, magnesium and chlorine produced by the steps consisting essentially of (1) reacting metallic magnesium having a large surface area per volume with from 2 to 10 mols of allyl chloride and from 1.75 to 4 mols of a di-lower alkyl ether, per gram-atom of magnesium at a temperature of from about 30° C to about 100° C, (2) maintaining the solid reaction product formed for at least 10 hours at a temperature of between about 30° C to about 140° C in order to age the same, (3) treating said solid reaction product formed, either together with or subsequent to said aging step (2), with from 0.2 to 4 mols of a di-lower alkyl sulfite, per gram-atom of magnesium, (4) reacting the aged and treated solid reaction product with from 0.5 to 10 mols of a titanium compound of the formula TiCl$_x$(OR)$_y$ wherein x is a number from 2 to 4, y is a number from 0 to 2 and the sum of x + y is 4, and R is a member selected from the group consisting of alkyl having 1 to 8 carbon atoms, cycloalkyl having 5 to 8 carbon atoms, chloroalkyl having 2 to 8 carbon atoms, chlorocycloalkyl having 5 to 8 carbon atoms and dichloroalkyl having 3 to 8 carbon atoms, per gram-atom of magnesium, for at least 1 hour at a temperature between about −20° C and about +140° C, and (5) separating said solid catalyst substance containing titanium, magnesium and chlorine.

2. The process of claim 1 wherein, in step (1), 2.2 to 10 mols of allyl chloride are employed.

3. The process of claim 1 wherein, in step (1), the reaction of said metallic magnesium with allyl chloride and dialkyl ether is conducted by first mixing the magnesium and allyl chloride and slowly adding the dialkyl ether.

4. The process of claim 1 wherein, in step (2), said reaction product formed is maintained at a temperature of about 50° C to about 80° C for from 24 to 150 hours.

5. The process of claim 1 wherein, in step (3), from 0.7 to 4 mols of said di-lower alkyl sulfite are employed.

6. The process of claim 1 wherein, in step (3), said solid reaction product formed is suspended in a hydrocarbon solvent boiling at from 30° C to 150° C before said treatment with said di-lower alkyl sulfite and said suspension contains from 0.2 to 2 gram-atoms of magnesium per liter.

7. The process of claim 1 wherein, in step (3), the alkyl groups in the di-lower alkyl sulfite are identical and each contains from 2 to 4 carbon atoms.

8. The process of claim 1 wherein, in step (4), from 1 to 5 mols of said titanium compound are employed.

9. The process of claim 1 wherein, in step (4), said reaction is conducted for from 1 to 25 hours.

10. The process of claim 1 wherein, in step (4), said titanium compound is a reaction product of one mol of TiCl$_4$ with from 0.5 to 2 mols of an oxide selected from the group consisting of vicinal alkylene oxides having from 2 to 8 carbon atoms, cycloalkene oxides having from 5 to 8 carbon atoms, and monochlorinated vicinal alkylene oxides having from 3 to 8 carbon atoms.

11. The process of claim 1 wherein, in step (4), R is alkyl having from 2 to 4 carbon atoms.

12. The process of claim 1 wherein, in step (4), the titanium compound is TiCl$_4$ and the polymerization reaction is carried out in two stages at different partial pressures of hydrogen.

13. A solid catalyst substance containing titanium, magnesium and chlorine for the polymerization of ethylene after activation with an organo-aluminum compound produced by the steps consisting essentially of (1) reacting metallic magnesium having a large surface area per volume with from 2 to 10 mols of allyl chloride and from 1.75 to 3 mols of a di-lower alkyl ether, per gram-atom of magnesium at a temperature of from about 30° C to about 100° C, (2) maintaining the solid reaction product formed for at least 10 hours at a temperature of between about 30° C to about 140° C in order to age the same, (3) treating said solid reaction product formed, either together with or subsequent to said aging step (2), with from 0.2 to 4 mols of a di-lower alkyl sulfite, per gram-atom of magnesium, (4) reacting the aged and treated solid reaction product with from 0.5 to 10 mols of a titanium compound of the formula $$Ti Cl_x (OR)_y$$

wherein $x$ is a number from 2 to 4, $y$ is a number from 0 to 2 and the sum of $x + y$ is 4, and R is a member selected from the group consisting of alkyl having 1 to 8 carbon atoms, cycloalkyl having 5 to 8 carbon atoms, chloroalkyl having 2 to 8 carbon atoms, chlorocycloalkyl having 5 to 8 carbon atoms and dichloroalkyl having 3 to 8 carbon atoms, per gram-atom of magnesium, for at least 1 hour at a temperature between about $-20°$ C and about $+140°$ C, and (5) separating said solid catalyst substance containing titanium, magnesium and chlorine.

14. The solid catalyst substance of claim 13, wherein, in step (1), 2.2 to 10 mols of allyl chloride are employed.

15. The solid catalyst substance of claim 13, wherein, in step (1), the reaction of said metallic magnesium with allyl chloride and dialkyl ether is conducted by first mixing the magnesium and allyl chloride and slowly adding the dialkyl ether.

16. The solid catalyst substance of claim 13, wherein, in step (2), said reaction product formed is maintained at a temperature of about 50° C to about 80° C for from 24 to 150 hours.

17. The solid catalyst substance of claim 13, wherein, in step (3), from 0.7 to 4 mols of said di-lower alkyl sulfite are employed.

18. The solid catalyst substance of claim 13, wherein, in step (3), said solid reaction product formed is suspended in a hydrocarbon solvent boiling at from 30° C to 150° C before said treatment with said di-lower alkyl sulfite and said suspension contains from 0.2 to 2 gram-atoms of magnesium per liter.

19. The solid catalyst substance of claim 13, wherein, in step (3), the alkyl groups in the di-lower alkyl sulfite are identical and each contains from 2 to 4 carbon atoms.

20. The solid catalyst substance of claim 13, wherein, in step (4), from 1 to 5 mols of said titanium compound are employed.

21. The solid catalyst substance of claim 13, wherein, in step (4), said reaction is conducted for from 1 to 25 hours.

22. The solid catalyst substance of claim 13, wherein, in step (4), said titanium compound is a reaction product of one mol of $TiCl_4$ with from 0.5 to 2 mols of an oxide selected from the group consisting of vicinal alkylene oxides having from 2 to 8 carbon atoms, cycloalkene oxide having 5 to 8 carbon atoms, and monochlorinated vicinal alkylene oxides having from 3 to 8 carbon atoms.

23. The solid catalyst substance of claim 13, wherein, in step (4), R is alkyl having from 2 to 4 carbon atoms.

24. The process for the production of a solid catalyst containing titanium, magnesium and chlorine for the polymerization of ethylene after activation with an organo-aluminum compound consisting essentially of (1) reacting metallic magnesium having a large surface area per volume with from 2 to 10 mols of allyl chloride and from 1.75 to 3 mols of a di-lower alkyl ether, per gram-atom of magnesium at a temperature of from about 30° C to about 100° C, (2) maintaining the solid reaction product formed for at least 10 hours at a temperature of between about 30° C to about 140° C in order to age the same, (3) treating said solid reaction product formed, either together with or subsequent to said aging step (2), with from 0.2 to 4 mols of a di-lower alkyl sulfite, per gram-atom of magnesium, (4) reacting the aged and treated solid reaction product with from 0.5 to 10 mols of a titanium compound of the formula $$Ti Cl_x (OR)_y$$

wherein $x$ is a number from 2 to 4, $y$ is a number from 0 to 2 and the sum of $x + y$ is 4, and R is a member selected from the group consisting of alkyl having 1 to 8 carbon atoms, cycloalkyl having 5 to 8 carbon atoms, chloroalkyl having 2 to 8 carbon atoms, chlorocycloalkyl having 5 to 8 carbon atoms and dichloroalkyl having 3 to 8 carbon atoms, per gram-atom of magnesium, for a least one hour at a temperature between about $-20°$ C and about $+140°$ C, and (5) separating said solid catalyst substance containing titanium, magnesium and chlorine.

* * * * *

UNITED STATES PATENT OFFICE
CERTIFICATE OF CORRECTION

Patent No. 4,029,864     Dated June 14, 1977

Inventor(s) DIETER KURZ, ERICH MANNER

It is certified that error appears in the above-identified patent and that said Letters Patent are hereby corrected as shown below:

| Col. | Line | |
|---|---|---|
| 5 | 16 | "simultaneously" employing" should be --simultaneously, employing-- |
| 5 | 28 | "my" should be --may-- |
| 12 | 1 | "4 mols" should be --3 mols-- |

Signed and Sealed this

Thirteenth Day of December 1977

[SEAL]

Attest:

RUTH C. MASON  
Attesting Officer

LUTRELLE F. PARKER  
Acting Commissioner of Patents and Trademarks